(12) United States Patent
Beeker

(10) Patent No.: US 12,172,521 B2
(45) Date of Patent: Dec. 24, 2024

(54) ENHANCED TETHER KILL SWITCH

(71) Applicant: TWIG Power, LLC, Novi, MI (US)

(72) Inventor: Jesse Beeker, Novi, MI (US)

(73) Assignee: TWIG Power, LLC, Novi, MI (US)

( * ) Notice: Subject to any disclaimer, the term of this patent is extended or adjusted under 35 U.S.C. 154(b) by 0 days.

(21) Appl. No.: 18/361,486

(22) Filed: Jul. 28, 2023

(65) Prior Publication Data
US 2024/0270071 A1 Aug. 15, 2024

Related U.S. Application Data

(60) Provisional application No. 63/393,244, filed on Jul. 29, 2022.

(51) Int. Cl.
*B60K 28/04* (2006.01)
*B60L 3/02* (2006.01)
(Continued)

(52) U.S. Cl.
CPC .............. *B60K 28/04* (2013.01); *B60L 3/02* (2013.01); *B62J 27/00* (2013.01); *B62K 11/00* (2013.01);
(Continued)

(58) Field of Classification Search
CPC .......... B60K 28/04; B60J 27/00; B62K 11/00; G01D 5/145; G01D 5/142; G01D 5/14;
(Continued)

(56) References Cited

U.S. PATENT DOCUMENTS 3,801,767 A * 4/1974 Marks ................. H01H 36/00
                                                       200/543
6,772,061 B1 * 8/2004 Berthiaume ........... B60R 25/23
                                                       701/115
(Continued)

FOREIGN PATENT DOCUMENTS

GB        2531590 A  *  4/2016    ........... B60L 3/00
GB        2541157 A  *  2/2017    ........... B60K 28/04
WO     2018/087509 A1    5/2018

OTHER PUBLICATIONS

Extended European Search Report issued in European Patent Application No. 23188614.4, Dated Dec. 4, 2023.

*Primary Examiner* — Keith J Frisby
(74) *Attorney, Agent, or Firm* — Benesch Friedlander Coplan & Aronoff LLP

(57) ABSTRACT

A tether kill switch for a motorcycle includes a sensor module and a key. The sensor module is adapted to receive the key and includes a magnetic substrate and at least one sensor. The key is adapted to magnetically couple with the sensor module. A vehicle control system includes a tether kill switch having a sensor module including a magnetic substrate and at least one programmable sensor. A first key and a second key each include at least one unique identifier, wherein the sensor module is adapted to receive either the first key or the second key that are each adapted to magnetically couple with the sensor module. The control system also includes a control unit, wherein the programmable sensor is adapted to identify at least one of the keys by the unique identifier, and send at least one information signal to the control unit based upon the unique identifier.

31 Claims, 4 Drawing Sheets

(51) Int. Cl.
| | |
|---|---|
| *B62J 27/00* | (2020.01) |
| *B62K 11/00* | (2006.01) |
| *G01D 5/14* | (2006.01) |
| *H01H 3/02* | (2006.01) |
| *H01H 27/00* | (2006.01) |
| *H01H 36/00* | (2006.01) |

(52) U.S. Cl.
CPC ........... *G01D 5/145* (2013.01); *H01H 3/0226* (2013.01); *H01H 27/00* (2013.01); *H01H 36/00* (2013.01); *B60Y 2200/12* (2013.01); *B60Y 2400/3012* (2013.01); *Y10S 200/02* (2013.01)

(58) Field of Classification Search
CPC ...... H01H 27/00; H01H 3/0226; H01H 36/00; B60Y 2200/12; B60Y 2400/3012; B63C 9/0005; B60L 3/02; B63B 32/73; B63B 2205/00; Y10S 200/02
USPC ........................................................ 180/272
See application file for complete search history.

(56) References Cited

U.S. PATENT DOCUMENTS

| | | | |
|---|---|---|---|
| 2005/0272565 A1* | 12/2005 | Hao | A63B 24/00 |
| | | | 482/54 |
| 2009/0090606 A1* | 4/2009 | Liao | H01H 3/0226 |
| | | | 200/338 |
| 2020/0031448 A1* | 1/2020 | Gonring | F02N 11/0803 |
| 2021/0139114 A1* | 5/2021 | Lee | B63B 32/45 |

* cited by examiner

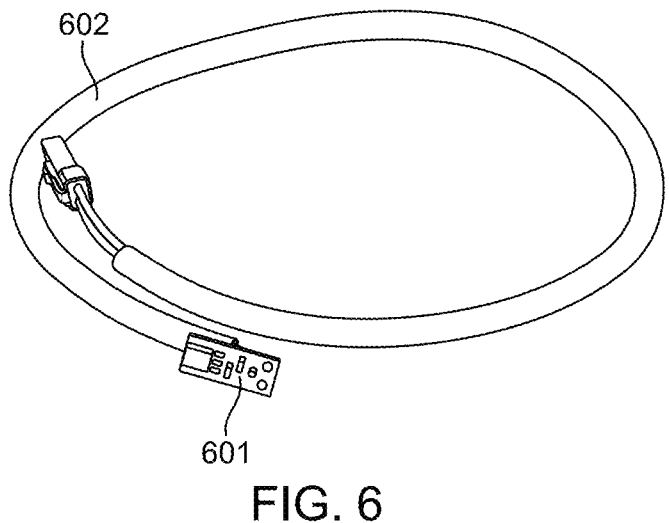
FIG. 6
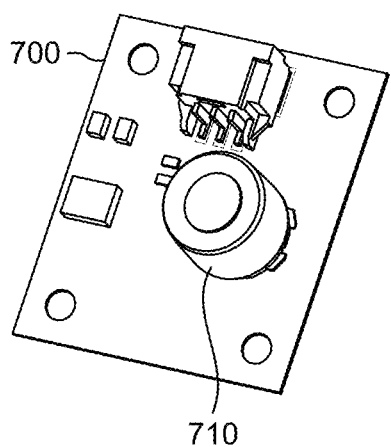
FIG. 7
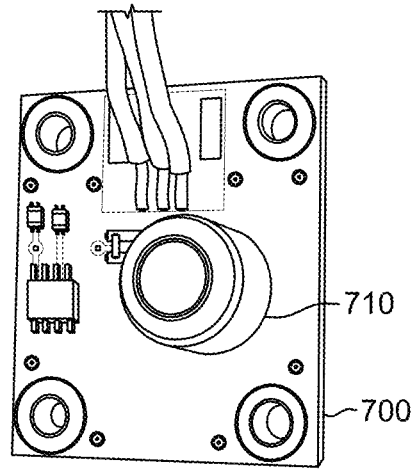
FIG. 8
| Voltage | Meaning |
|---|---|
| <0.5 | Short To Ground |
| 1.35V | Yellow Key Button Pressed |
| 1.80V | No Key Button Pressed |
| 2.25V | Red Key Button Pressed |
| 2.70V | Yellow Key |
| 3.60V | No Key |
| 4.50V | Red Key |
| >4.5 | Short To VDD |
FIG. 9

ENHANCED TETHER KILL SWITCH

CROSS-REFERENCE TO RELATED APPLICATIONS

This application claims priority to U.S. Provisional Patent Application No. 63/393,244 titled "Enhanced Tether Kill Switch" and filed on Jul. 29, 2022, the disclosure of this patent application being incorporated herein by reference in their entirety.

FIELD OF INVENTION

The present disclosure generally relates to a tether kill switch for a motorcycle. More specifically, the present disclosure relates to a tether kill switch for a motorcycle including programmable functionality relating to the interaction between a sensor module and a tether key.

BACKGROUND

As electric motorcycles emerge to become a commercial product offered for sale to consumers, core technology changes are required to address the gas to electric powertrain transformation. One such area is how the motorcycle is enabled or disabled should an emergency event happen, such as loss of control or crash. This feature is commonly known as a kill switch. The most basic instantiation of a kill switch for an engine is a user switch that physically grounds the electrical path for the engine ignition circuit. More modern engines with engine management or fuel injection use the switch to ground concept as a control signal to shut down the engine via hardware or software logic.

With the inherent electronic control of an electric motorcycle, the solution possibilities for a kill switch open up far beyond a simple grounding logic. The design freedom begins with the ability to define if the "kill" logic is active high or active low. Further, the lack of electrical actuation required in the electric motorcycle use case opens up the ability to use very different switch sensing technologies that are not viable for an engine based control system. First implementations for electric motorcycles, specifically off-road dirt bikes, have used a magnetic switch where the key breaks away via a tether strap attached to the rider should the rider lose control and release the handlebars. Such a method has been used for some time on personal watercraft where water ingress prevents the traditional kill switch to be used. This base concept of the tether kill switch has been adopted into electric racing rules for motocross and drives the fundamental safety system required for a race legal product.

With evaluation of existing electric motorcycle tether kill switch solutions and broad rider feedback, the existing magnetic switch solution has proven unreliable due to moving parts. Such evidence can be seen by the common occurrence where the tether is basically not used and taped on to prevent it from turning off the bike during rides. Testing has produced cases where the switch internally stuck and prevented operations.

SUMMARY

A novel tether kill switch for a motorcycle is described herein. One embodiment of the invention comprises a sensor module adapted for mounting on the handlebar of a motorcycle, the sensor module having a magnetic substrate, a magnetic key adapted to be received by the sensor module and further adapted to be tethered to the rider, a programmable hall sensor coupled to the sensor module, the hall sensor adapted to provide information relating to the key, and a wire harness connecting the hall sensor to the motorcycle.

BRIEF DESCRIPTION OF THE DRAWINGS

In the accompanying drawings, structures are illustrated that, together with the detailed description provided below, describe example embodiments of the disclosed systems, methods, and apparatus. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

FIG. 6 is a photograph depicting an embodiment of a sensor and wire harness of a tether kill switch for motorcycles;

FIGS. 7 and 8 are photographs depicting embodiments of a circuit board of a tether kill switch for motorcycles;

FIG. 9 is a chart illustrating an embodiment of programming of a tether kill switch for motorcycles;

DETAILED DESCRIPTION

The apparatus, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of tether kill switches for electric motorcycles are hereinafter disclosed and described in detail with reference made to FIGS. 1 through 11.

Implementation of solid state is included in some embodiments of the tether kill switch. This enables the kill switch functionality to go to a true sensor, where signal processing may optionally occur. This leads to increased robustness of the kill switch function as well as new functionality that goes beyond on/off control. Embodiments of the present invention may optionally be used as a direct replacement for existing handlebar mounted kill switches.

Figure 1:
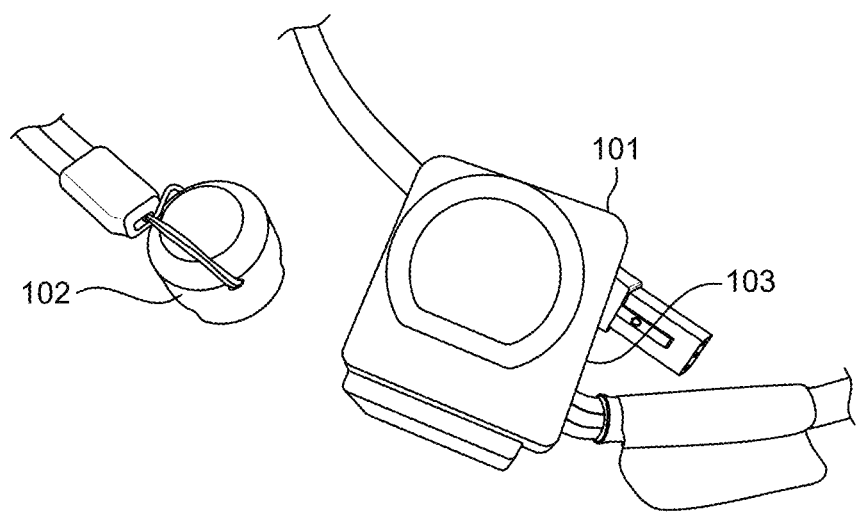
FIGS. 1 through 4 are photographs depicting embodiments of a tether kill switch for motorcycles.
Figure 2:
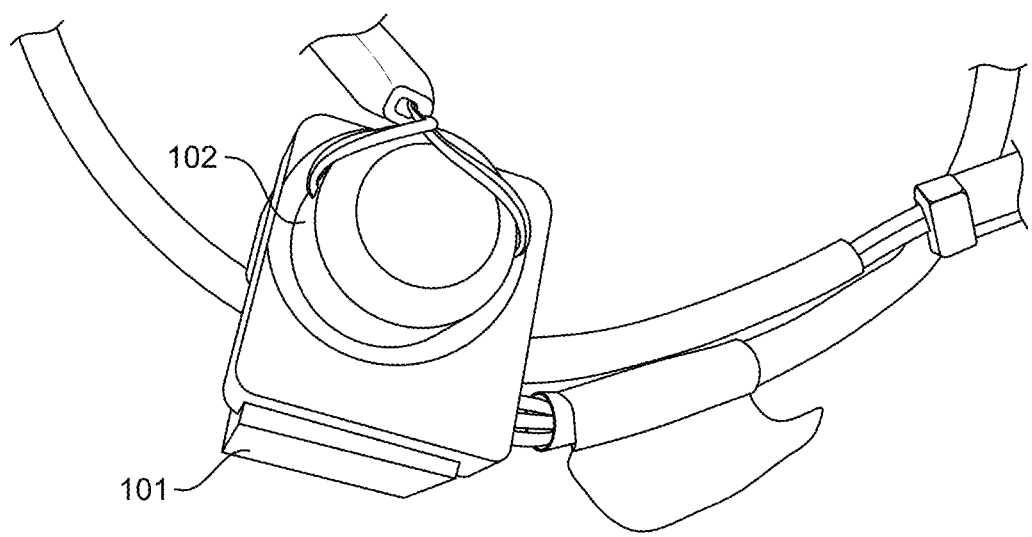

In one embodiment, with reference to FIGS. 1 and 2, the invention includes a sensor module 101 and a key 102. The key 102 magnetically attaches to the sensor module 101 to create a passive attachment that may be quickly removed should the rider lose control. The sensor module 101 then transmits information that can be processed by a control module to deactivate propulsion.

The key 102 is made of any suitable material. In an example, the key 102 is a plastic body that has a complementing shape to the sensor module 101 and incorporates at least one magnet. The sensor module 101 has a magnetic substrate embedded inside to provide an attractive interface to the key 102. A magnetic sensor is then placed into the sensor housing where it can detect information about the key, such as presence. Magnetic sensor is typically a hall or magneto-restive technology, or similar technology. Output from the magnetic sensor can include a simple switch type output or an analog output. The magnetic sensor optionally includes a programmable sensor and, optionally, other circuitry.

In an embodiment, and with further reference to FIGS. 7 and 8, a magnetic sensor is mounted to circuit board 700 to facilitate transfer of a signal from the sensor. While this example illustrates usage of a circuit board, it will be appreciated that any suitable mechanism may be used to provide the functionality set forth herein. Functionality of the sensor module including a magnetic sensor includes, optionally, sensor-to-magnet orientation and distances, different key 102 detection, and additional signals by optionally using additional devices, such as by using a switch.

In an embodiment, a programmable hall sensor comprises the magnetic sensor, where the output of the sensor is optionally programmed with respect to the changes in the magnetic field as created by interaction between the key 102 and the magnetic sensor. In an embodiment, the magnetic sensor is coplanar, and located adjacent to, the magnet substrate, allowing the presence and orientation of key 102 to be determined. With reference to FIGS. 1 and 2, magnetic sensor 103 is coplanar and under the magnetic substrate. Additionally, by using a switch or similar device to apply a gain to the magnetic sensor output signal, the actuation of such a switch could further be detected.

Figure 3:
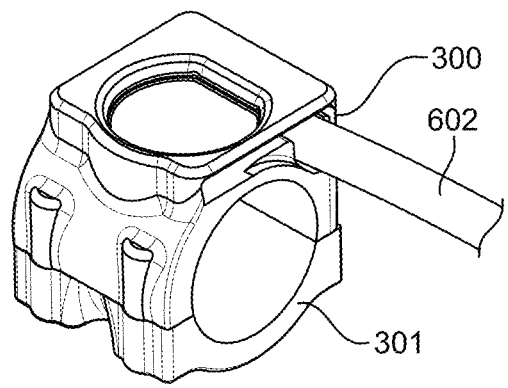
Figure 4:
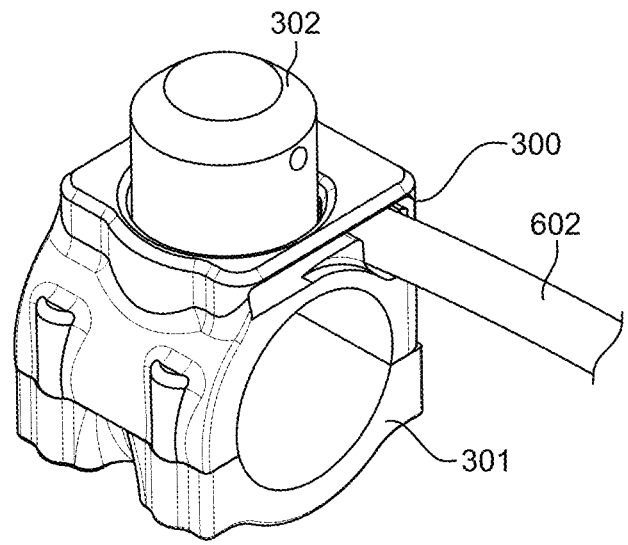

With reference to FIGS. 3 and 4, an embodiment of a tether kill switch of the present invention is illustrated. Tether kill switch 300 comprises sensor module 301 and at least one key 302. Sensor module 301 includes a programmable hall sensor. In an example, two keys are used along with a switch, the switch applying a gain of 0.5. With reference to FIG. 9, exemplary voltages 901 provided by the tether kill switch are provided. For example, using a yellow key without activating the switch (i.e., without pressing the button) has the sensor module delivering a signal relating to a voltage of 2.70. In another example, using a red with the switch pressed delivers a signal relating to a voltage of 2.25. While these embodiments are illustrated with a signal delivery corresponding to a voltage, it will be appreciated that any suitable method of creating a signal can be used.

Figure 10:
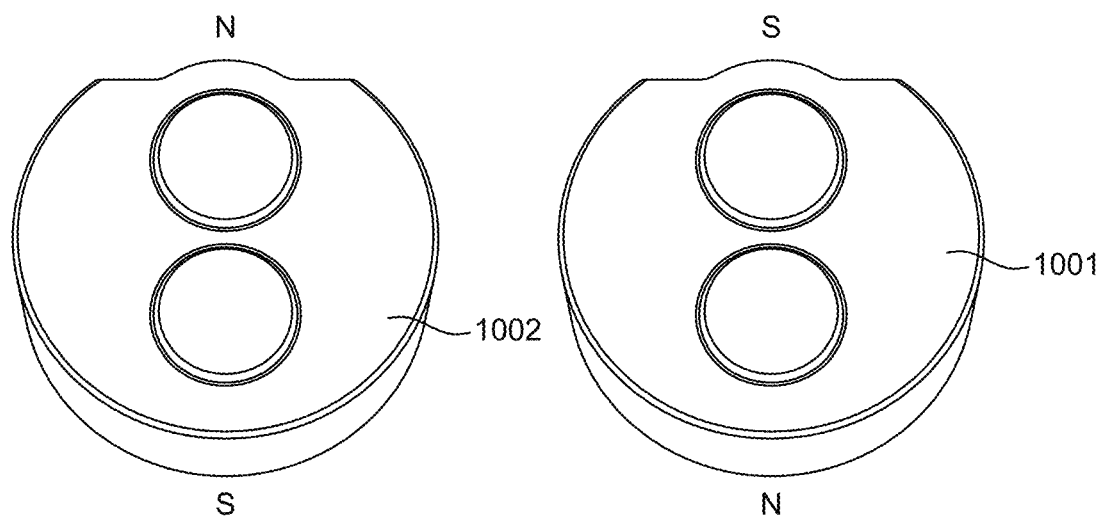
FIG. 10 is a photograph depicting embodiments of keys of a tether kill switch for motorcycles.

With reference to FIG. 10, unique identification of each of the keys 1001 and 1002 is achieved by use of two magnets mounted with opposing polarity. Keys may be differentiated by physical orientation using a notch adjacent to different magnet polarity. Stronger key detection may be realized by switching polarity of the magnets. Use of two magnets optionally creates a desired pull force for removing the key from the magnetic substrate. Additional orientations are possible by moving the notch to other locations relative to the magnets.

With reference to FIG. 6, a magnetic sensor (optionally a programmable hall sensor) on a circuit board 601 and wire harness 602 are illustrated. With further reference to FIGS. 3 and 4, the sensor on board 601 is optionally mounted in sensor module 300 and connected to wire harness 602. Wire harness 602 may be connected to any suitable part of the motorcycle. In an embodiment, wire harness 602 is connected to a control module of the motorcycle and sends information to the control module, optionally as a signal. Such information may include the status of the kill switch, the location and orientation of the key to the sensor module, the identity of the key, and any other suitable information, such as illustrated in FIG. 9.

Figure 11:
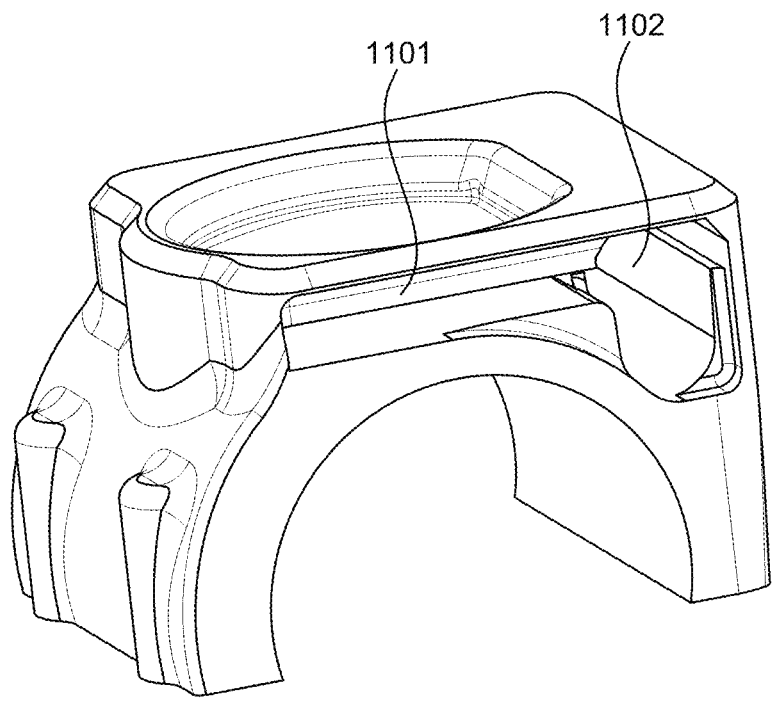
FIG. 11 is a photograph depicting an embodiment of a sensor housing of a tether kill switch for motorcycles.

With reference to FIG. 11, an exemplary sensor module is illustrated, including a cavity 1101 adapted to receive a magnetic substrate, and a cavity 1102 adapted to receive a magnetic sensor, optionally including a programmable sensor comprised of a circuit board.

Figure 5:
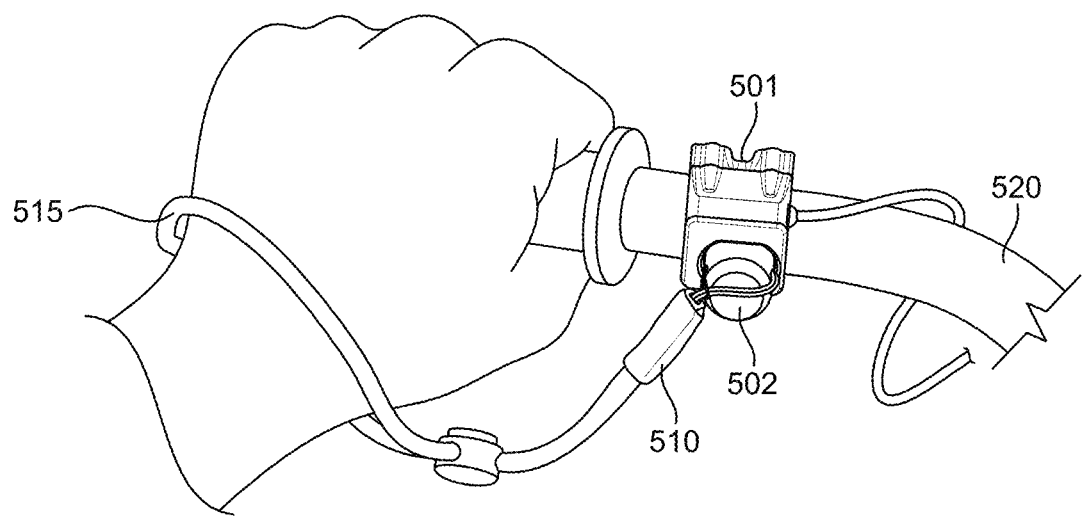
FIG. 5 is a photograph depicting an embodiment of a tether kill switch as mounted on a handle of a motorcycle.

With reference to FIG. 5, an embodiment of a tether kill switch of the present invention is illustrated, including a sensor module 501 attached to a motorcycle's handlebar 520, and a key 502 received by the sensor module 501 and tethered 510 to the hand 515 of the electric motorcycle operator. A magnetic sensor, optionally a programmable hall sensor with information outputted to the motorcycle's control module, allows the ability to filter the kill switch signal, which mitigates false shutdowns. Functionality of a programmable sensor as set forth herein optionally includes the ability to do diagnostics related to wire harness disconnect, damage or failure that is simply not possible with the standard switch solution.

Intelligent sensing functionality further optionally allows a motorcycle to use different keys that enable different operation. Motorcycle operations related to different keys include special performance modes, training modes, and speed limitations, and also optionally include motor/vehicle speed, torque/power, response behavior, special feature enablement (such as holeshot mode or traction control), run time limit (for example, obtaining a go-kart ticket to get a different time limit and you get the key that goes with it), safety limits (for example, having a key wherein all safety systems are disabled and run at all costs or having a key wherein the motorcycle shuts down or slows down sooner).

In operation, the programmable sensor detects which key is in use and provides a signal which is consumed or processed by an electronic control unit of a vehicle; the control unit then modifies the performance or operations of the motorcycle based at least in part on the identity of the key. For example, a tether kill switch of the current invention is optionally connected to a control module on a motorcycle. A performance map is provided which identifies one or more motorcycle operations or performances. The performance map is contained wherever suitable, including a part or the whole in the control unit. The tether kill switch detects what key is in use, sends a signal corresponding to such use to the control unit, and the performance map is accessed. In an example wherein a performance map contains up to six operations or performances (selected by, for example, actuating a rider-controlled switch), by using two different keys, a total of up to twelve maps can be achieved without making more indicators other than the identity (for example, the color) of the key. Given the software nature dictating the performance of an electric powertrain, the addition of a second key doubles the number of existing performance mode options a bike can have without creating the need of additional display indicators for the new modes.

In another embodiment of the present invention, the sensor module further includes at least one switch. Such a switch is any suitable user-actuated switch, and may optionally be included at any suitable place on the sensor module. For example and with reference to FIGS. 7 and 8, circuit board 700 includes switch 710. With the optional addition of a switch, special functions can be implemented where the rider can command a software enabled feature without removing the grip of the handlebars and also without a need for additional wires or signals. Such a feature can include extra power to make a pass, active mode switching, or temporary power reduction for slippery conditions. An alternative to the analog output is a digital data stream using the SENT protocol from automotive. Lower cost solutions could use a 2 wire interface using a current measurement instead of voltage. Key sensing could use near field communication (NFC) leading to programmable keys.

The foregoing description of examples has been presented for purposes of illustration and description. It is not intended to be exhaustive or limiting to the forms described. Numerous modifications are possible in light of the above teachings. For example, while many examples have been presented with respect to a motorcycle, the examples set forth herein can be applied to any suitable vehicle or motor vehicle. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

I claim:

1. A tether kill switch for a motorcycle, comprising:
a first key; and
a sensor module including a magnetic substrate and at least one sensor, the at least one sensor including a hall sensor, the sensor module being configured to receive the key,
wherein the key is adapted to magnetically couple with the sensor module.

2. The tether kill switch of claim 1, wherein the key is adapted as a tether attachable to a rider of the motorcycle.

3. The tether kill switch of claim 1, wherein the at least one sensor includes at least a programmable sensor.

4. The tether kill switch of claim 3, wherein the programmable sensor is a magnetic sensor adapted to process information regarding the respective magnetic orientation of the sensor module and the key.

5. The tether kill switch of claim 3, wherein the programmable sensor is a magnetic sensor adapted to process information regarding the distance between the sensor module and the key.

6. The tether kill switch of claim 3, further comprising:
at least a second key, wherein the first key includes at least a first unique identifier, and the second key includes at least one a second unique identifier different from the first unique identifier of the first key, and wherein the programmable sensor is configured to identify at least one of the first or second keys.

7. A tether kill switch for a motorcycle having a handlebar and a rider, comprising:
a sensor module adapted for mounting on the handlebar;
the sensor module having a magnetic substrate;
a magnetic key adapted to be received by the sensor module and further adapted to be tethered to the rider;
a programmable hall sensor coupled to the sensor module, the hall sensor adapted to provide information relating to the key; and
a wire harness connecting the hall sensor to the motorcycle.

8. The tether kill switch of claim 7, wherein the hall sensor is adapted to provide information to a control module of the motorcycle.

9. The tether kill switch of claim 8, wherein the hall sensor information identifies the spatial relationship between the sensor module and the key.

10. The tether kill switch of claim 8, wherein the hall sensor information identifies the orientation of the key to the sensor module.

11. The tether kill switch of claim 8, wherein the hall sensor information identifies the key.

12. The tether kill switch of claim 11, wherein the sensor module is adapted to provide one or more information signals based upon the identification of the key.

13. The tether kill switch of claim 8, wherein the sensor module further comprises:
at least one rider-actuatable switch.

14. The tether kill switch of claim 13, wherein the at least one rider-actuatable switch is adapted to provide at least a first information signal or a second information signal based upon rider usage of the switch.

15. The tether kill switch of claim 14, wherein the motorcycle further comprises a control unit for modifying at least one aspect of the performance of the motorcycle, and wherein the sensor module provides at least one information signal to the control unit based upon information provided by rider usage of the at least one rider-actuatable switch.

16. The tether kill switch of claim 8, wherein the motorcycle further comprises a control unit having at least one performance map, the performance map having at least one operation relating to performance of the motorcycle, and wherein the sensor module provides at least one information signal to the control unit, and the control unit modifies performance of the motorcycle based at least in part on an operation from the performance map and an information signal provided by the sensor module.

17. A vehicle control system comprising:
a tether kill switch comprising:
a sensor module including a magnetic substrate and at least one programmable sensor, and
at least a first key having at least a first unique identifier, and a second key having at least a second unique identifier that is different from the first unique identifier of the first key, wherein the sensor module is configured to receive either the first key or the second key, and wherein the first key and the second key are adapted to magnetically couple with the sensor module; and
a control unit, wherein the programmable sensor is adapted to identify at least one of the first or second keys by its respective unique identifier and send at least one information signal to the control unit based upon the unique identifier.

18. The control system of claim 17, wherein the control unit contains at least one performance feature and the control unit modifies the performance of the vehicle based upon at least one of the keys and the at least one information signal.

19. A tether kill switch for a motorcycle comprising:
a first key; and
a sensor module including a magnetic substrate and at least one sensor, the at least one sensor including a magneto resistive (MR) sensor, the sensor module being configured to receive the key,
wherein the key is adapted to magnetically couple with the sensor module.

20. The tether kill switch of claim 19, wherein the key is adapted as a tether attachable to a rider of the motorcycle.

21. The tether kill switch of claim 19, wherein the at least one sensor includes at least a programmable sensor.

22. The tether kill switch of claim 21, wherein the programmable sensor is a magnetic sensor adapted to process information regarding the respective magnetic orientation of the sensor module and the key.

23. The tether kill switch of claim 21, wherein the programmable sensor is a magnetic sensor adapted to process information regarding the distance between the sensor module and the key.

24. The tether kill switch of claim 21, further comprising:
at least a second key, wherein the first key includes at least a first unique identifier, and the second key includes at least a second unique identifier different from the first unique identifier of the first key, and wherein the programmable sensor is configured to identify at least one of the first or second keys.

25. A tether kill switch for a motorcycle comprising:
a first key; and
a sensor module configured to receive the key, and comprising:
a magnetic substrate, and
at least one sensor including at least a programmable sensor,
wherein the key is adapted to magnetically couple with the sensor module.

26. The tether kill switch of claim 25, wherein the at least one sensor includes a hall sensor.

27. The tether kill switch of claim 25, wherein the at least one sensor includes a magneto resistive (MR) sensor.

28. The tether kill switch of claim 25, wherein the key is configured as a tether attachable to a rider of the motorcycle.

29. The tether kill switch of claim 25, wherein the programmable sensor is a magnetic sensor adapted to process information regarding the respective magnetic orientation of the sensor module and the key.

30. The tether kill switch of claim 25, wherein the programmable sensor is a magnetic sensor adapted to process information regarding the distance between the sensor module and the key.

31. The tether kill switch of claim 25, further comprising:
at least a second key, wherein the first key includes at least a first unique identifier, and the second key includes at least a second unique identifier different from the first unique identifier of the first key, and wherein the programmable sensor is configured to identify at least one of the first or second keys.

\* \* \* \* \*